(12) United States Patent
Minamisawa

(10) Patent No.: US 10,782,591 B2
(45) Date of Patent: Sep. 22, 2020

(54) OPTICAL UNIT WITH SHAKE CORRECTION FUNCTION

(71) Applicant: NIDEC SANKYO CORPORATION, Suwa-gun Nagano (JP)

(72) Inventor: Shinji Minamisawa, Suwa-gun Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 121 days.

(21) Appl. No.: 15/939,949

(22) Filed: Mar. 29, 2018

(65) Prior Publication Data

US 2018/0284566 A1 Oct. 4, 2018

(30) Foreign Application Priority Data

Mar. 30, 2017 (JP) ................................. 2017-066743

(51) Int. Cl.
*G02B 27/64* (2006.01)
*G02B 7/00* (2006.01)
(Continued)

(52) U.S. Cl.
CPC ................. *G03B 5/00* (2013.01); *G02B 7/02* (2013.01); *G02B 27/646* (2013.01);
(Continued)

(58) Field of Classification Search
CPC . G02B 7/00; G02B 7/02; G02B 7/021; G02B 7/023; G02B 27/64; G02B 27/646; G03B 5/00; G03B 5/06; G03B 2205/0023; G03B 2205/0069; H04N 5/22521; H04N 5/2253; H04N 5/2254; H04N 5/2257; H04N 5/23287
See application file for complete search history.

(56) References Cited

U.S. PATENT DOCUMENTS

| 6,064,827 A * | 5/2000 | Toyoda ................ G02B 27/646 396/55 |
| 2008/0187301 A1* | 8/2008 | Takahashi ................ G03B 5/00 396/55 |

(Continued)

FOREIGN PATENT DOCUMENTS

JP 2009150929 A 7/2009

*Primary Examiner* — Thong Q Nguyen
(74) *Attorney, Agent, or Firm* — Cantor Colburn LLP

(57) ABSTRACT

An optical unit may include an optical module; a supporting member; a rotation supporting mechanism to support the supporting member; a fixing member supporting the supporting member; and a rolling magnetic driving mechanism. The rotation supporting mechanism may include a rolling bearing. The rolling magnetic driving mechanism may include a magnet and a coil. The fixing member may include a main body; a spring member; and a movable holder. The movable holder may oppose the supporting member. The supporting member may include a supporting member side opposing part. The rolling bearing may include an inner ring; an outer ring; and a ball that rolls between the inner ring and the outer ring. The movable holder may hold either one of the magnet and the coil, and the supporting member side opposing part holds the other. The spring member may bias the movable holder toward the supporting member side opposing part.

6 Claims, 11 Drawing Sheets

(51) Int. Cl.
*G03B 5/00* (2006.01)
*H04N 5/232* (2006.01)
*H04N 5/225* (2006.01)
*G02B 7/02* (2006.01)

(52) U.S. Cl.
CPC ......... *H04N 5/2253* (2013.01); *H04N 5/2254* (2013.01); *H04N 5/23287* (2013.01); *G03B 2205/0023* (2013.01); *G03B 2205/0069* (2013.01)

(56) References Cited

U.S. PATENT DOCUMENTS

2016/0330375 A1* 11/2016 Sekimoto ............. G02B 27/646
2018/0284567 A1* 10/2018 Minamisawa ........... G03B 5/00
2019/0018259 A1* 1/2019 Minamisawa ........... G03B 5/06

* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2017-066743 filed Mar. 30, 2017, the entire content of which is incorporated herein by reference.

BACKGROUND

Field of the Invention

The present invention relates to an optical unit with shake correction function that is incorporated in a handheld terminal or a mobile object and a method for manufacturing the optical unit with shake correction function.

Description of Related Documents

An image pickup device mounted on a mobile object such as a handheld terminal, a vehicle, or an unmanned helicopter is provided with an optical unit having mounted an optical module for image acquisition thereon. The optical unit of such a type is required to restrict distortion of a picked up image exerted by vibration of the image pickup device. Therefore, as the optical unit, there has been proposed an optical unit with shake correction function provided with: a swingable supporting mechanism configured to swingably support an optical module; and a rotation supporting mechanism configured to rotatably support the optical module at the periphery of an optical axis in such a manner the optical module is swung by a magnetic driving mechanism for swing in a pitching (longitudinal swing: tilting) and a yawing (transverse swing: panning) direction crossing the optical axis, and the optical module is rotated at the periphery of the optical axis by a magnetic driving mechanism for rolling.

In Japanese Unexamined Patent Application Publication No. 2009-150929, there is described a rotation supporting mechanism configured to rotatably support an optical module at the periphery of an optical axis. In this document, the optical module is supported by a fixing member that surrounds the optical module in a radial direction that is orthogonal to an optical axis. The rotation supporting mechanism is a ball bearing, and is provided with: an inner ring that is held by the optical module; an outer ring that is held by a supporting member; and a ball configured to roll between the inner ring and the outer ring. A center of each of the inner ring and the outer ring is coaxial to the optical axis.

In a case where a rolling bearing such as a ball bearing is employed as a rotation supporting mechanism, if a given pressure is applied to the rolling bearing, there has been a problem that rotation becomes unstable.

SUMMARY

At least an embodiment of the present invention has been made in view of the problem described above, and at least an embodiment of the present invention provides an optical unit with shake correction function which is capable of applying a given pressure to a rolling bearing when a supporting member configured to support an optical module has been supported on a fixing member via the rolling bearing.

In order to solve the problem described above, at least an embodiment of the present invention takes technical means as summarized below.

In other words, according to at least an embodiment of the present invention, there is provided an optical unit with shake correction function including: an optical module configured to hold an optical element; a supporting member configured to support the optical module; a rotation supporting mechanism configured to rotatably support the supporting member at a periphery of a predetermined axis; a fixing member configured to support the supporting member via the rotation supporting mechanism; and a magnetic driving mechanism for rolling configured to rotate the supporting member, wherein the rotation supporting mechanism comprises a rolling bearing, the magnetic driving mechanism for rolling comprises a magnet and a coil that respectively oppose to each other in a direction of the axis, the fixing member comprises: a fixing member main body; a spring member that is fixed to the fixing member main body; and a movable holder that is supported by the fixing member main body via the spring member, the movable holder being movable in the direction of the axis, the movable holder opposes to the supporting member in the direction of the axis, the supporting member comprises a supporting member side opposing part that opposes to the movable holder, a magnetic driving mechanism for rolling comprises a magnet and a coil that respectively oppose to each other in a direction of an axis, the rolling bearing comprises: an inner ring that is coaxial to the axis, the inner ring being held by the supporting member; an outer ring that is disposed on an outer circumferential side of the inner ring, the outer ring being held by the movable holder; and a ball configured to roll between the inner ring and the outer ring, the movable holder is configured to hold either one of the magnet and the coil, the supporting member side opposing part is configured to hold another one of the magnet and the coil, and the spring member is configured to bias the movable holder toward the supporting member side opposing part to thereby cause the outer ring to abut against the supporting member side opposing part.

According to at least an embodiment of the present invention, an inner ring of a rolling bearing is held by a supporting member configured to support the optical module, and the outer ring is held by a movable holder of a fixing member. The movable holder is also biased by a plate spring, and a given pressure is thereby applied to the outer ring, and the outer ring abuts against a supporting member side opposing part of the supporting member. In this manner, the inner ring and the outer ring are positioned in the Z axis direction with reference to the supporting member. In addition, the outer ring is maintained in a state in which the outer ring is abutted against the supporting member side opposing part by way of a biasing force of the plate spring. Accordingly, rotation of the supporting member can be stabilized. In addition, if the outer ring that is held by the movable holder abuts against the supporting member side opposing part, a relative location between the movable holder and the supporting member side opposing part in the direction of the axis is determined. In this manner, a gap between either one of a magnet and a coil that are held by the movable holder and the other one of the magnet and the coil that are held by the supporting member side opposing part is precisely defined. Therefore, the supporting member can be stably rotated by the magnetic driving mechanism for rolling.

According to at least an embodiment of the present invention, it is desirable that the coil be held by the supporting member side opposing part; the magnet be held by the movable holder; the movable holder comprise a yoke that abuts against the magnet from an opposite side to the supporting member side opposing part; and the spring member be configured to abut against the yoke from an opposite side to the magnet to thereby bias the movable holder. In this manner, the magnetic driving mechanism for rolling is capable of improving a driving torque of rotating the supporting member in comparison with a case in which any yoke is not provided. In addition, the magnetic driving mechanism for rolling is capable of restricting power consumption in the case of generating the same torque, in comparison with the case in which any yoke is not provided.

According to at least an embodiment of the present invention, it is desirable that the supporting member side opposing part be provided with a shaft part that projects toward the movable holder in the direction of the axis, the shaft part being configured to hold the inner ring. In this manner, the inner ring of the rolling bearing can be easily held by the supporting member.

According to at least an embodiment of the present invention, it is desirable that a fixing member main body be provided with: a pair of spring member fixing parts configured to fix the spring member on both sides on which the axis is sandwiched therebetween; and a deformation range defining part configured to define a deformation range in which the spring member deforms; the spring member fixing part be provided with: an end face oriented in a direction from the movable holder toward the supporting member in the direction of the axis; and a projection that projects from the end face; the spring member be a plate spring that is overhung on the projection of the pair of spring member fixing parts; the movable holder be held between the pair of spring member fixing parts; and the end face of the spring member fixing part be the deformation range defining part and be capable of abutting against the plate spring when the plate spring has deformed in a direction that is spaced from the supporting member. In this manner, in a case where an external impact is received, it may be possible to prevent the plate spring from being excessive deformed and damaged.

According to at least an embodiment of the present invention, it is desirable that a second rotation supporting mechanism configured to rotatably support the supporting member at the periphery of the axis in a location that is spaced from the rotation supporting mechanism in the direction of the axis be provided; the fixing member main body be provided with a fixing member side opposing part that opposes to the supporting member from an opposite side to the movable holder in the direction of the axis; the supporting member be provided with a second supporting member side opposing part that opposes to a fixing member side opposing part in the direction of the axis; the second rotation supporting mechanism be provided with: a fixing member side annular groove that is provided in the fixing member side opposing part, the fixing member side annular groove surrounding the axis; a supporting member side annular groove that is provided in the second supporting member side opposing part, the supporting member side annular groove opposing to the fixing member side annular groove; and a rolling member that is inserted into the fixing member side annular groove and the supporting member side annular groove, the rolling member rolling between the fixing member side opposing part and the second supporting member side opposing part; and the spring member be configured to bias the supporting member toward the fixing member side opposing part via the movable holder and the outer ring. In this manner, the supporting member is supported by two rotation supporting mechanisms. Therefore, a rotary shaft of the supporting member does not vibrate, and rotation of the supporting member can be stabilized. In addition, a spring configured to apply a given pressure to the outer ring of the rolling bearing biases the supporting member toward the fixing member side opposing part via the movable holder and the outer ring. In this manner, the second supporting member side opposing part is biased toward the fixing member side opposing part, and the given pressure is applied to the second rotation supporting mechanism. Accordingly, the supporting member is reliably supported by the rotation supporting mechanism, and rotation of the supporting member can be stabilized.

According to at least an embodiment of the present invention, in order to swing an optical module, a magnetic driving mechanism for swing is provided; the supporting member is configured to support the optical module via a swingable supporting mechanism configured to swingably support the optical module between a reference posture in which the axis and an optical axis are coincident with each other and a tilt posture in which the optical axis tilts relative to the axis; and the magnetic driving mechanism for swing is capable of swinging the optical module relative to the supporting member.

With an optical unit with shake correction function according to at least an embodiment of the present invention, an outer ring of a rolling bearing configured to rotatably support a supporting member is biased via a movable holder toward the supporting member configured to hold an inner ring. In this manner, a given pressure is applied to the rolling bearing, and the inner ring and the outer ring are positioned in a direction of an axis with reference to the supporting member. In addition, the outer ring is maintained in a state in which the outer ring is abutted against a supporting member side opposing part by way of a biasing force of a spring member. Accordingly, rotation of the supporting member can be stabilized.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, at least an embodiment of an optical unit will be described with reference to the accompanying drawings. In the present specification, three axes X, Y, and Z correspond to their directions that are respectively orthogonal to each other; one side in the X axis direction is designated by +X and the other side by −X; one side in the Y axis direction is designated by +Y and the other side by −Y; and one side in the Z axis direction is designated by +Z and the other side by −Z. The Z axis direction is coincident with a direction of an axis of an optical module. The +Z direction corresponds to an object side in the direction of the axis of the optical module. The −Z direction corresponds to a counter-object side (image side) in the direction of the axis.

(Entire Configuration)

Figure 1:
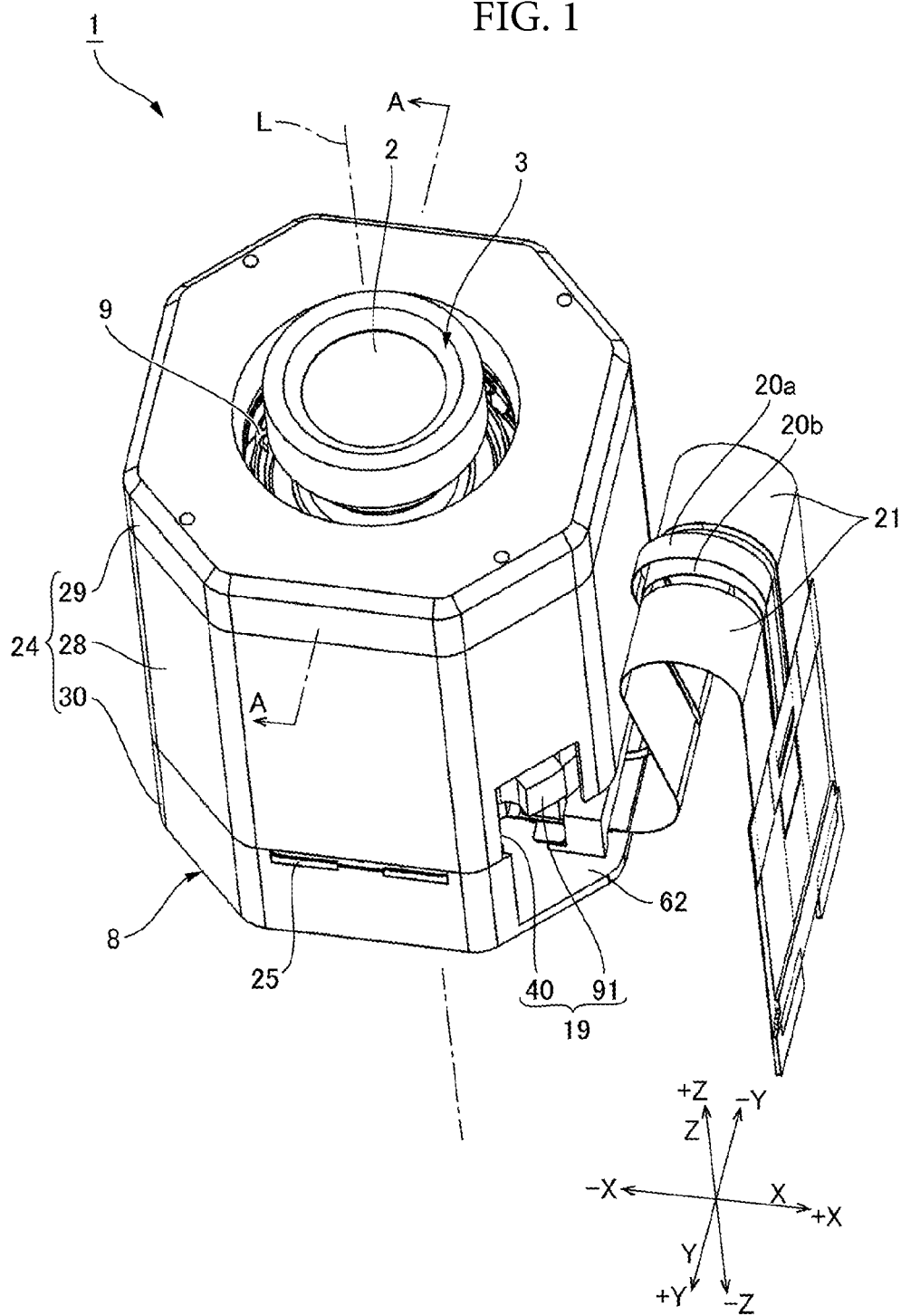
FIG. 1 is a perspective view when an optical unit to which at least an embodiment of the present invention is applied is seen from an object side.
Figure 2:
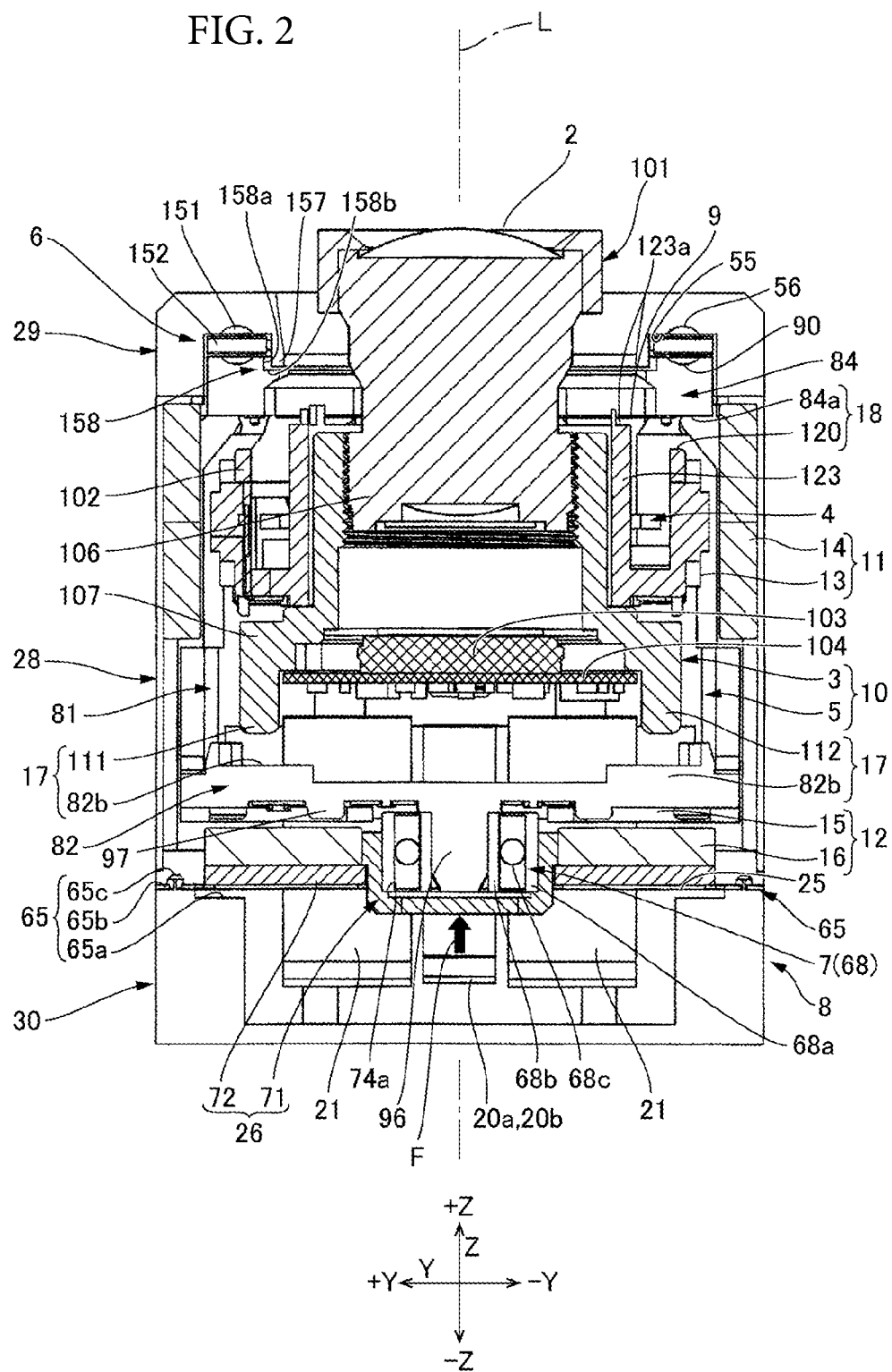
FIG. 2 is a sectional view of the optical unit taken along the line A-A of FIG. 1.
Figure 3:
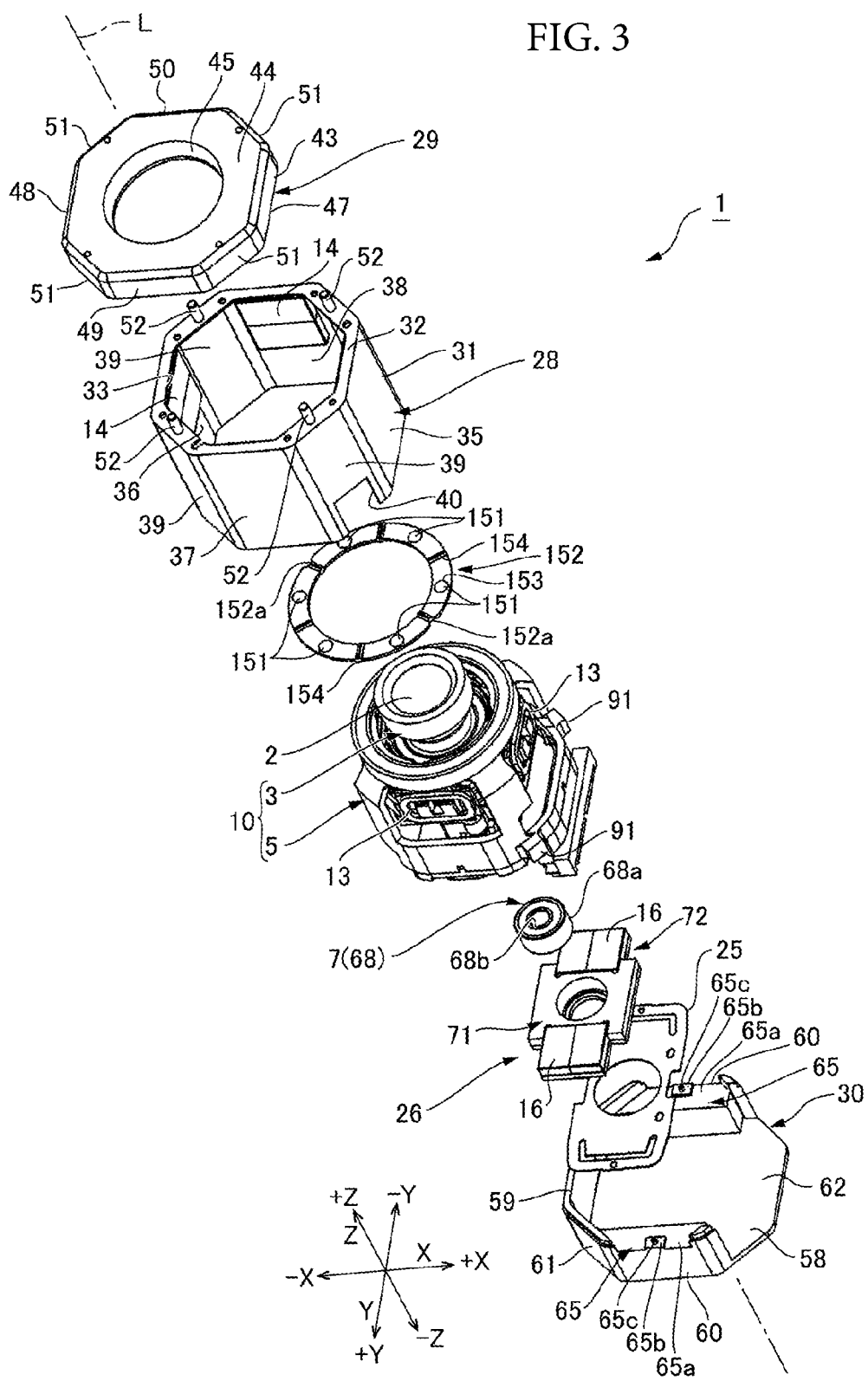
FIG. 3 is an exploded perspective view when the optical unit of FIG. 1 is seen from the object side.
Figure 4:
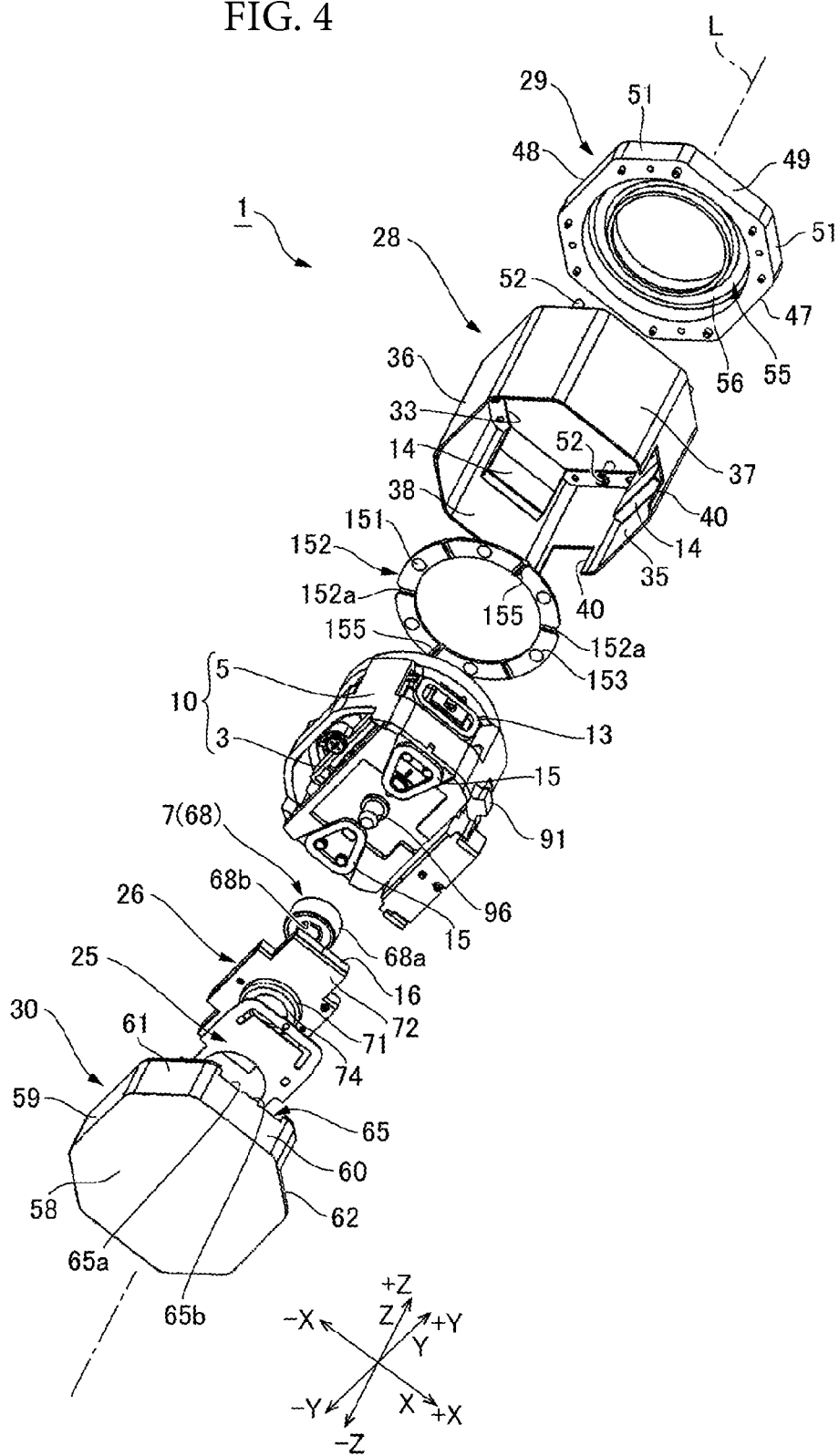
FIG. 4 is an exploded perspective view of the optical unit of FIG. 1 when seen from a counter-object side.

FIG. 1 is a perspective view of the optical unit, when seen from the object side. FIG. 2 is a sectional view of the optical unit taken along the line A-A of FIG. 1. FIG. 3 is an exploded perspective view of the optical unit of FIG. 1 when seen from the object side. FIG. 4 is an exploded perspective view of the optical unit of FIG. 1 when seen from the counter-object side. Incidentally, it is to be noted that in the figures other than FIG. 1, a flexible printed circuit board is briefly shown. The optical unit 1 shown in FIG. 1 is employed as an optical device such as a cellular phone with camera or a drive recorder or an optical device such as an action camera or a wearable camera that are mounted on a mobile object such as a helmet, a bicycle, or a radio controlled helicopter. In such an optical device, if vibration of the optical device occurs at the time of image acquisition, distortion of a picked up image occurs. The optical unit 1 is an optical unit with shake correction function configured to correct tilt of a movable member 3 in order to avoid tilting of the picked up image.

As shown in FIG. 2, the optical unit 1 is provided with: the movable member 3 (optical module) provided with an optical element 2; a swingable supporting mechanism 4 configured to swingably support the movable member 3; and a holder 5 (supporting member) configured to support the movable member 3 via the swingable supporting mechanism 4. In addition, the optical unit 1 is provided with: an object side rotation supporting mechanism 6 (second rotation supporting mechanism) and a counter-object side rotation supporting mechanism 7 (rotation supporting mechanism), both of which are configured to rotatably support the holder 5; and a fixing member 8 configured to support the holder 5 via the object side rotation supporting mechanism 6 and the counter-object side rotation supporting mechanism 7. Further, the optical unit 1 is provided with a plate spring 9 that is overhung between the movable member 3 and the holder 5.

The swingable supporting mechanism 4 is configured to swingably support the movable member 3 between a reference posture in which a predetermined axis L and an optical axis of the optical element 2 are coincident with each other and a tilt posture in which the optical axis tilts relative to the axis L. The swingable supporting mechanism 4 is a gimbal mechanism. The counter-object side rotation supporting mechanism 6 and the counter-object side rotation supporting mechanism 7 are configured to rotatably support the holder 5 at the periphery of the axis L. In other words, the object side rotation supporting mechanism 6 and the counter-object side rotation supporting mechanism 7 are configured to rotatably support, at the periphery of axis L, a second movable member 10 made of the holder 5 and the movable member 3 that is swingably supported by the holder 5. The object side rotation supporting mechanism 6 is configured between the fixing member 8 and the second movable member 10 (holder 5). The counter-object side rotation supporting mechanism 7 is positioned on the side in the −Z direction (counter-object side) more significantly than the object side rotation supporting mechanism 6. A plate spring 9 is for defining the reference posture of the movable member 3.

In addition, the optical unit 1 is provided with: a magnetic driving mechanism 11 for swing configured to swing the movable member 3; and a magnetic driving mechanism 12 for rolling configured to rotate the second movable member 10 (holder 5 and movable member 3). The magnetic driving mechanism 11 for swing is provided with a swing driving coil 13 that is held by the movable member 3; and a swing driving magnet 14 that is held by a fixing member 8. The swing driving coil 13 and the swing driving magnet 14 respectively oppose to each other in a radial direction that is orthogonal to the axis L. The magnetic driving mechanism 12 for rolling is provided with: a rolling driving coil 15 that is held by the second movable member 10 (holder 5 and movable member 3); and a rolling driving magnet 16 that is held by the fixing member 8. In the present embodiment, the rolling driving coil 15 and the rolling driving magnet 16 respectively oppose to each other in the Z axis direction (direction of the axis).

Further, the optical unit 1 is provided with: a first stopper mechanism 17 and a second stopper mechanism 18 that define a swinging range of the movable member 3; and a third stopper mechanism 19 (refer to FIG. 1) configured to define a rotation range of the holder (second movable member). Furthermore, the optical unit 1 is provided with a flexible printed circuit board 20a, 21b, 21. The flexible printed circuit board 20a is electrically connected to the rolling drive coil 15. The flexible printed circuit board 20b is electrically connected to the swinging drive coil 13. The flexible printed circuit board 21 is electrically connected to a board 104 that the movable member 3 holds.

(Fixing Member)

As shown in FIG. 1, FIG. 3, and FIG. 4, the fixing member 8 has: a fixing member main body 24 configured by assembling three casings 28, 29, 30; a plate spring 25 (spring member) that is fixed to the fixing member main body 24; and a movable holder 26 that is supported by the fixing member main body 24 via the plate spring 25. The movable holder 26 is supported in a movable state in the Z axis direction. As shown in FIG. 1, the fixing member main body 24 is provided with: a cylindrical casing 28 formed in a substantially octagonal shape when seen from the side in the Z axis direction (direction of the axis); an object side casing 29 that is assembled in the +Z-direction (object side) relative to the cylindrical casing 28; and a counter-object side casing 30 that is assembled in the −Z direction (counter-object side) relative to the cylindrical casing 28. The cylindrical casing 28 is formed of a magnetic material. The object side casing 29 and the counter-object side casing 30 each are formed of a resin material.

As shown in FIG. 3, the cylindrical casing 28 is provided with: a cylindrical body part 31 formed in an octagonal shape; and a frame-shaped end plate part 32 extending to the inside from an end part in the +Z direction of the body part 31. In a center of the end plate part 32, a substantially octagonal aperture part 33 is formed. The body part 31 is provided with: side plates 35, 36 respectively opposing to each other in the X axis direction; side plates 37, 38 respectively opposing to each other in the Y axis direction; and a side plate 39 provided at four corners, each of which tilts at an angle of 45 degrees relative to the X axis direction and the Y axis direction. As shown in FIG. 3 and FIG. 4, on the inner circumferential faces of the side plates 35, 36 respectively opposing to each other in the X axis direction and the side plates 37, 38 respectively opposing to each other in the Y axis direction, swing driving magnets 14 are respectively fixed. In addition, as shown in FIG. 4, in two side plates 39 that are positioned in the +X direction of four side plates 39, rectangular cutout parts 40 are respectively formed. The cutout parts 40 each are formed in a shape in which an end edge in the −Z direction of the side plate 39 is cut away in the +Z direction.

A object side casing 29 is provided with: a cylindrical body part 43 that abuts against an end plate part 32 of a cylindrical casing 28; and an end plate part 44 extending to the inside from an end part in the +Z direction of the body part 43. In a center of the end plate part 32, a circular aperture part 45 is formed. As shown in FIG. 4, an inner circumferential face of the body part 43 is formed in a substantially circular shape, and an outer circumferential face thereof is formed in an octagonal shape when seen in the Z axis direction. The outer circumferential face of the body part 43 is provided with: side faces 47, 48 that respectively oppose to each other in the X axis direction; side faces 49, 50 that respectively oppose to each other in the Y axis direction; and side faces 51 that are provided at four corner parts tilting at an angle of 45 degrees relative to the X axis direction and Y axis direction. The object side casing 29 is fixed to the cylindrical casing 28 by way of four head screws that pass through the end plate part 32 of the cylindrical casing 28, the four head screws being helically screwed into the body part 43. Here, a face in the −Z direction of the end plate part 32 is an annular face of which center is coaxial to the axis L, and is a fixing member side opposing part 55 that corresponds to the holder 5 in the Z axis direction as well. In the fixing member side opposing part 55, a fixing member side annular groove 5 is provided. The fixing member side annular groove 56 is formed in the shape of a circular ring at the periphery of the optical axis, the related center is coaxial to the axis L, and the related sectional shape is an arc shape.

A counter-object side casing 30, as shown in FIG. 3, is provided with: an end plate part 58 formed in a substantially octagonal shape that is orthogonal to the axis L; a wall part 59 rising in the +Z direction from an end edge (edge) in the −Z direction of the end plate part 58; two wall parts 60 rising in the +Z direction from an end edge (edge) in the −Z direction of the end plate part 58, the two wall parts respectively opposing to each the in the Y axis direction; and two wall parts 61 that are positioned between the wall part 59 and a respective one of the two wall parts 60, each of which tilts at an angle of 45 degrees relative to the X axis direction and the Y axis direction. Here, a wall part is not provided at an end edge (edge) in the +X direction of the end plate part 58, and an aperture part 62 is provided between the ends in the +X direction of the two wall parts 60 that respectively oppose to each other in the Y axis direction. As shown in FIG. 1, the aperture part 62 is a drawing outlet of each of flexible printed circuit boards 20a, 20b, 21.

At end portions in the +Z direction of the two wall parts 60 that respectively oppose to each other in the Y axis direction, a pair of plate spring fixing parts 65 (spring member fixing parts) respectively configured to fix both end portions in the Y direction of the plate spring 25 are provided. The pair of the plate spring fixing parts 65 are disposed on both sides on which the Z axis is sandwiched therebetween. Each plate spring fixing part 65 is provided with: end faces 65a respectively spreading in the X axis direction and Y axis direction in an offset location in the −Z direction more significantly than a tip end of the wall part 59; a rectangular projection part 65b that is formed at an edge portion on the outer circumferential side of each end face 65a; and a circular projection 65c that projects in the +Z direction from a center of the rectangular projection part 65b.

Figure 5:
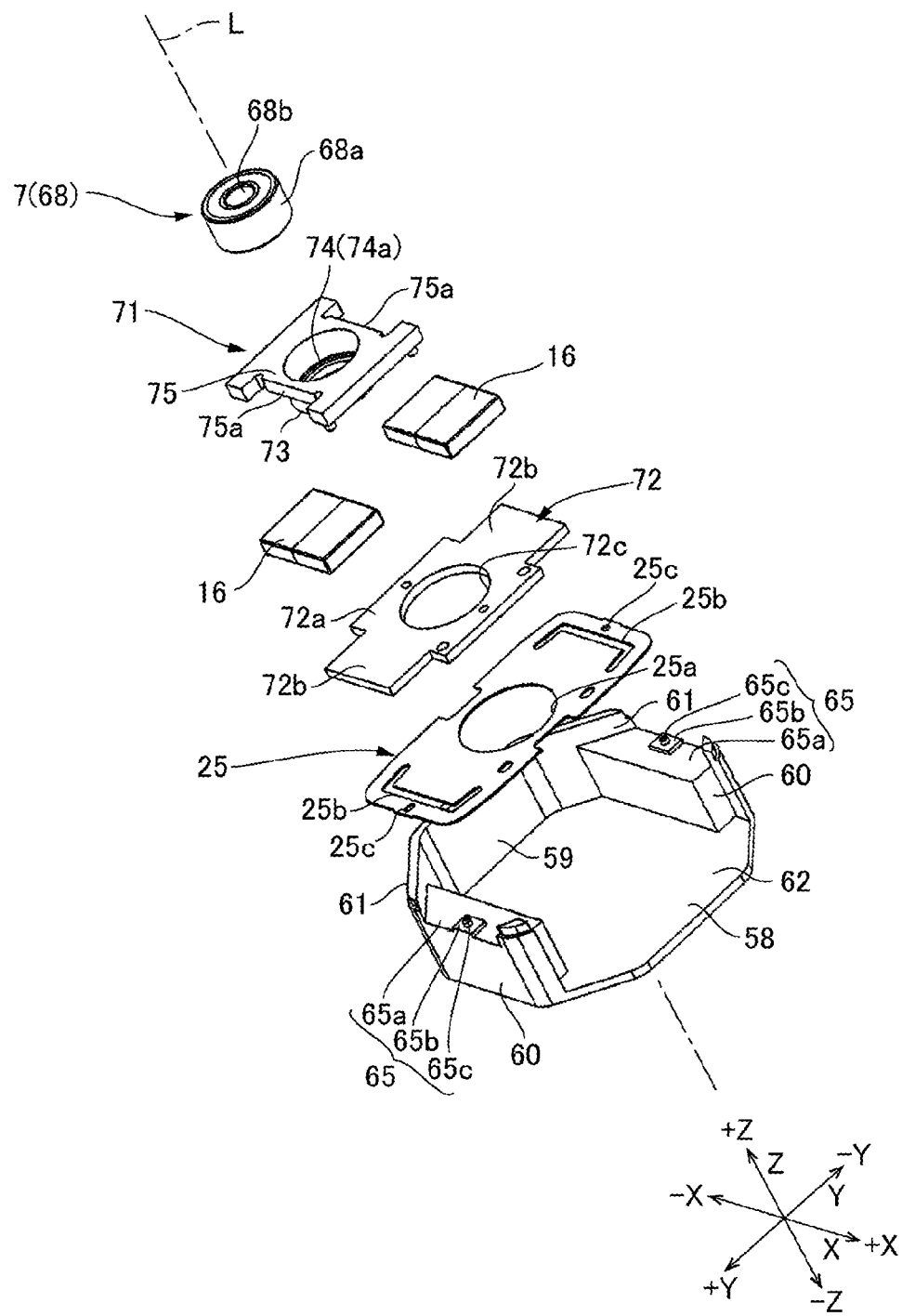
FIG. 5 is an exploded perspective view of a counter-object side portion of a fixing member.
Figure 8:
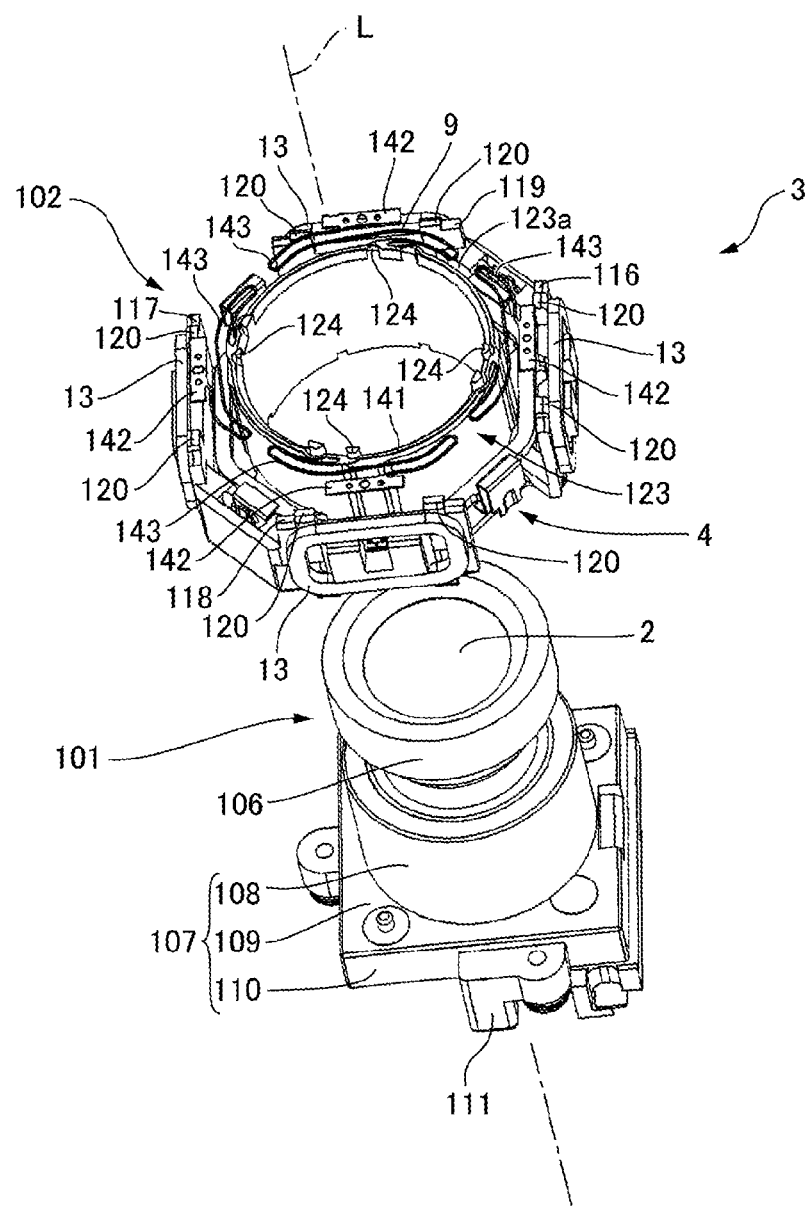
FIG. 8 is an exploded perspective view of the movable member when seen from the object side.

FIG. 5 is an exploded perspective view of the counter-object side portions (counter-object side rotation supporting mechanism 7, movable holder 26, plate spring 25, and counter-object side casing 30) of the fixing member 8. As shown in FIG. 8, the movable holder 26 is provided with: an outer ring 68a of a ball bearing 68 that configures the counter-object rotation supporting mechanism 7; and a movable holder main body member 71 configured to hold two rolling driving magnets 16. In addition, the movable holder 26 is provided with a yoke 72 that abuts against the movable holder main body member 71 from the side in the −Z direction. The movable holder main body part 71 is provided with: a cylinder part 73 into which the outer ring 68a engages on the inner circumferential side; a circular ring-shaped part 74 that projects to the inner circumferential side from an end in the −Z direction of the cylinder part 73; and a magnet holding part 75 spreading to the outer circumferential side from an end portion in the +Z direction of the cylinder part 73. The circular ring-shaped part 74 is provided with an annular abutment part 74a that abuts against the outer ring 68a from the side in the −Z direction. The magnet holding part 75 has a pair of depression parts 75a that depress from both sides in the Y axis direction to the inside in the radial direction. The two rolling driving magnets 16 are respectively engaged into depressing parts 75a, and are held by the movable holder main body member 71 so as to determine positions in the X direction and the Y direction.

A yoke 72 is formed of a magnetic material. The yoke 72 is provided with: a rectangular wide portion 72a that is positioned at a center portion in the Y axis direction; and a rectangular portion 72b extending from the wide portion 72a to both sides in the Y axis direction. A width of the rectangular portion 72b in the X axis direction is smaller than a width of the wide portion 72a. In a center of the wide portion, a circular hole 72c is provided. In the yoke 72, the cylinder part 73 of the movable holder main body member 71 is inserted into the circular hole 72c from the side in the +Z direction; the wide portion 72a abuts against the movable holder main body member 71 in the −Z direction; and the rectangular portion 72 abuts against the rolling drive magnet 16 in the −Z direction. A contour shape of the yoke 72 is coincident with a contour shape of the movable holder main body member 71 having held the rolling drive magnet 16 by itself when seen from the side in the Z axis direction. Here, in the yoke 72, an adhesive agent is applied to a portion which the rolling drive magnet 16 abuts against, and the rolling drive magnet 16 is fixed to the yoke 72 as well.

The plate spring 25 has a substantially rectangular contour shape that is elongated in the Y axis direction, the plate spring 25 has a through hole 25a through which the cylinder part 72 of the movable holder main body member 71 can be inserted into the center in the Y axis direction. In addition, the plate spring 25 has a U-shaped slit 25b on both sides in the Y axis direction while the through hole 25a is sandwiched therebetween. The shape of the two slits 25b is adapted to frame an end portion in the Y axis direction of the yoke 72 when the yoke 72 and the plate spring 25 are overlapped each other. In addition, the plate spring 25 has a fixing hole 25c for fixing the plate spring 25 to the spring fixing part 65 at each end portion in the Y axis direction (outer in the Y axis direction than the two slits 25b).

The plate spring 25 is supported by the plate spring fixing part 65 in a state in which the projection 65c is inserted into the fixing hole 25c and then a center portion of both end portions in the Y axis direction is placed in the projection part 65b. In this manner, the plate spring 25 is overhung between the projections 65c of a pair of plate spring fixing parts 65. In addition, as shown in FIG. 1, the cylindrical casing 28 and the counter-object side casing 30 are assembled, whereby the plate spring 25 is sandwiched between the cylindrical casing 28 and the counter-object side casing 30 and then is fixed to the fixing member 8. Here, as shown in FIG. 2, the plate spring 25 attains a biasing force F of biasing the movable holder 26 in the +Z axis direction (object side) when the movable member 3 has been supported by the fixing member 8.

That is, an end face on the side in the −Z direction of the yoke 72 which the plate spring 25 abuts against from the side in the −Z direction in the movable holder 26 is positioned in the −Z direction more significantly than a fixing location of the plate spring 25 in the fixing member 8 (between the cylindrical casing 28 and the counter-object side casing 30). Therefore, in a state in which the plate spring 25 holds the movable holder 26 in a center portion thereof, if both end portions in the Y axis direction are fixed to the fixing member 8, an outer portion in the Y axis direction than the yoke 72 in the plate spring 25 (outer portion than two slits 25b in the plate spring 25) slackens in a direction tilting in the +Z direction towards the outer circumferential side. In this manner, in the plate spring 25, the center portion slackens in the −Z direction (counter-object side) more significantly than both end portions in the Y axis direction that is fixed to the plate spring fixing part 65 and thus by way of its elastic resilience force, the movable holder 26 is biased in the +Z axis direction.

(Holder)

Figure 6:
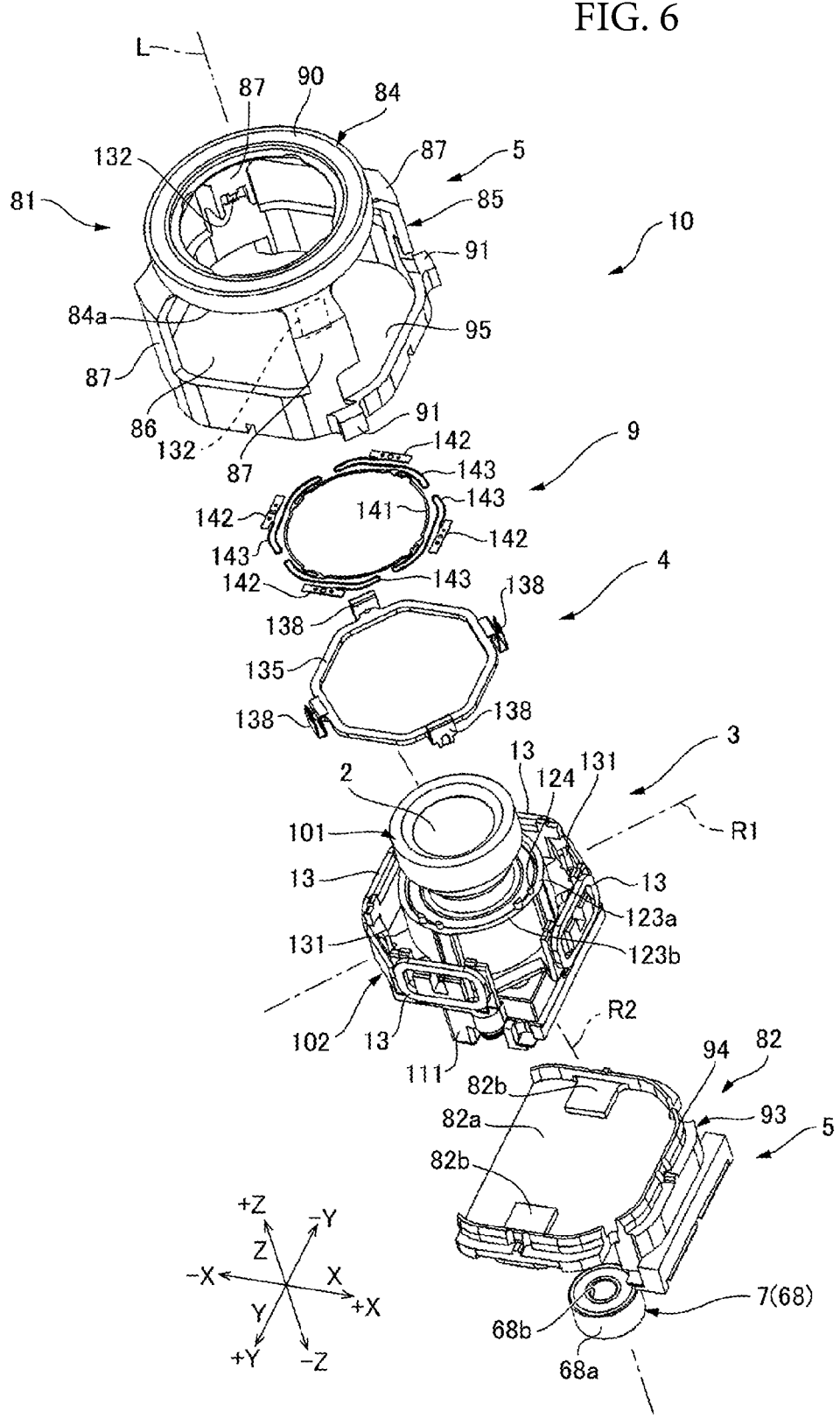
FIG. 6 is an exploded perspective view of a movable member and a holder when seen from the object side.
Figure 7:
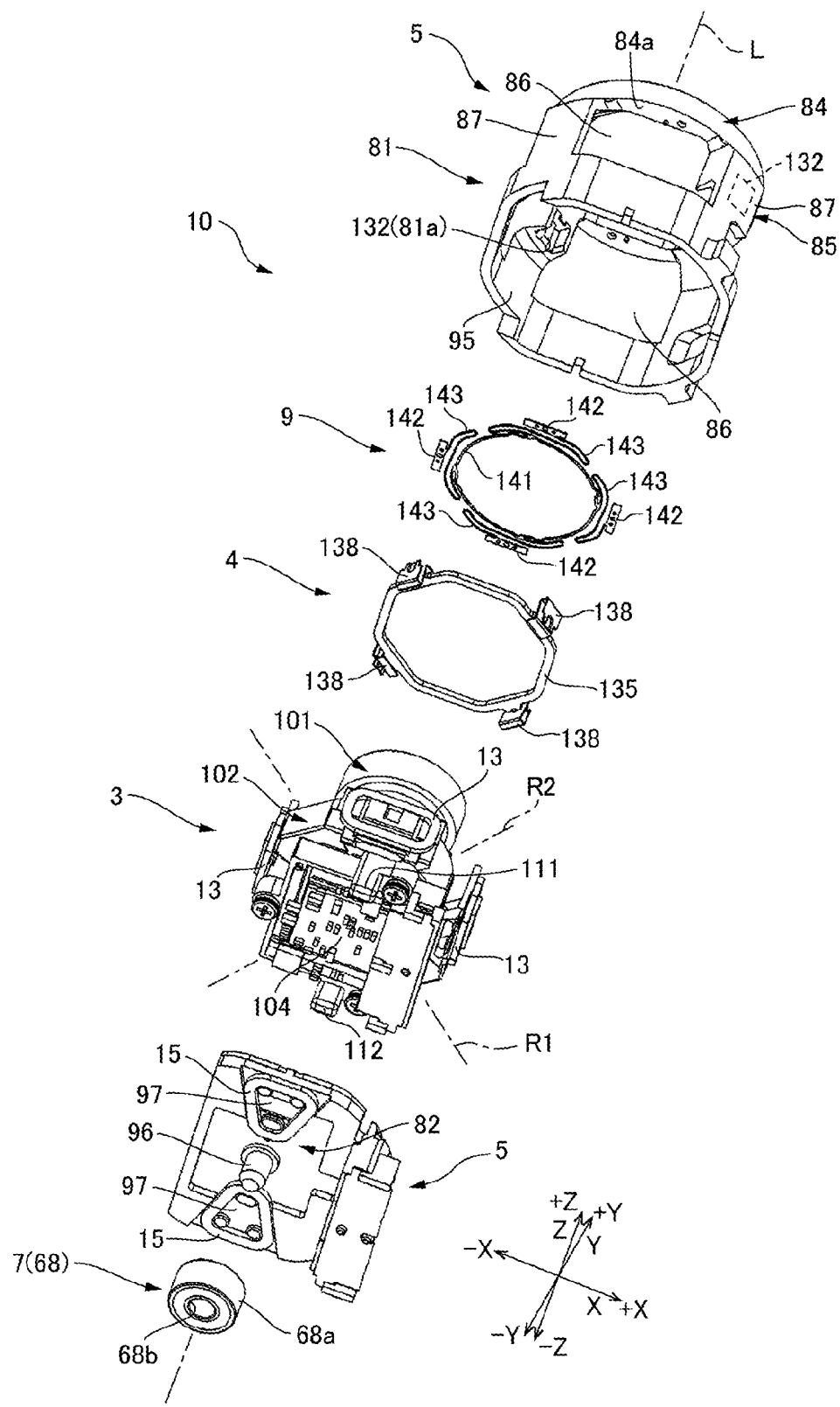
FIG. 7 is an exploded perspective view of the movable member and the holder when seen from the counter-object side.

FIG. 6 is an exploded perspective view of the movable member 3 and the holder 5 (second movable member 10) when seen from the side in the +Z direction. FIG. 7 is an exploded perspective view of the movable member 3 and the holder 5 (second movable member 10) when seen from the side in the −Z direction. As shown in FIG. 6, the holder 5 is provided with: a holder main body member 81 that is positioned on the outer circumferential side of the movable member 3; and a holder bottom plate member 82 (supporting member side opposing part) that is fixed to the holder main body member 81 from the side in the −Z direction, the holder bottom plate member opposing to the movable member 3. The holder main body member 81 and the holder bottom plate member 82 are made of a resin.

As shown in FIG. 6, the holder main body member 81, at an end in the +Z direction, is provided with: an annular holder side opposing part 84 (second supporting member side opposing part) that opposes to the annular fixing member side opposing part 55 in the fixing member 8 (object side casing 29); and a holder body part 85 that is continuous to the side in the −Z direction of the holder side opposing part 84. The holder body part 85 is provided with: four window parts 86 that are arranged in the circumferential direction; and four longitudinal frame parts 87 configured to partition the window parts 86 that are respectively adjacent to each other in the circumferential direction. Two window parts 85 of the four window parts 86 open in the X axis direction, and the other two open in the Y axis direction. The four longitudinal frame parts 87 each are disposed in an angular location between the X axis direction and the Y axis direction.

The holder side opposing part 84 is an annular face on which an end face on the side in the +Z direction is orthogonal to the axis L, and on the annular face, a holder side annular groove 90 (supporting member side annular groove) is provided. The holder side annular groove 90, in the Z axis direction, opposes to the fixing member side annular groove 56 that is provided in the holder side opposing part 84. The holder side annular groove 90 is formed in the shape of a circular ring at the periphery of the optical axis, the related center is coaxial to the axis L, and the related sectional shape is an arc shape. The holder side opposing part 84 is provided with an annular end face 84a that is orthogonal to the axis L, the annular end face being oriented in the −Z direction.

In an end portion in the −Z direction in the holder body part 85, a projection 91 that projects in an intermediate direction between the +X direction and the +Y direction and a projection 91 that projects in a middle direction between the +X direction and −Y direction are provided.

The holder bottom plate member 82 is provided with an opposing face 82a that is orthogonal to the axis L, the opposing face opposing to the movable member 3 from the side in the −Z direction. In each end portion in the Y axis direction in the opposing face 82a, a rectangular projection portion 82b that projects in the +Z direction is provided. In an outer circumferential edge of the opposing face 82a of the holder bottom plate member 82, a stepped part 93 that surrounds a bottom plate on both sides in the Y axis direction and from the side in the +X direction is provided. The stepped part 93 is provided an annular projection part 94 that projects in the +Z direction on the inner circumferential side. When the holder bottom plate member 82 has been fixed to the holder main body member 81, the annular projection part 94 engages into an aperture part 95 in the −Z direction of the holder main body member 81 (holder body part 85).

In addition, the holder bottom plate member 82, as shown in FIG. 7, is provided with a shaft part 96 that projects in the −Z direction. The shaft part 96 is provided so as to be coaxial to the axis L. The shaft part 96 is configured to hold the inner ring 68b of the ball bearing 68 on the outer circumferential side. An end face in the +Z direction in the inner ring 68b abuts against the holder bottom plate member 82. In addition, the holder bottom plate member 82 is provided with a rolling driving coil holding part 97 on both sides on which the shaft part 96 is sandwiched therebetween in the Y axis direction. The rolling driving coil 15 is held by the rolling driving coil holding part 97 from the side in the −Z direction. Here, the flexible printed circuit board 20a is electrically connected to the rolling driving coil 15 that is held by the holder bottom plate member 82.

(Movable Member)

Figure 9:
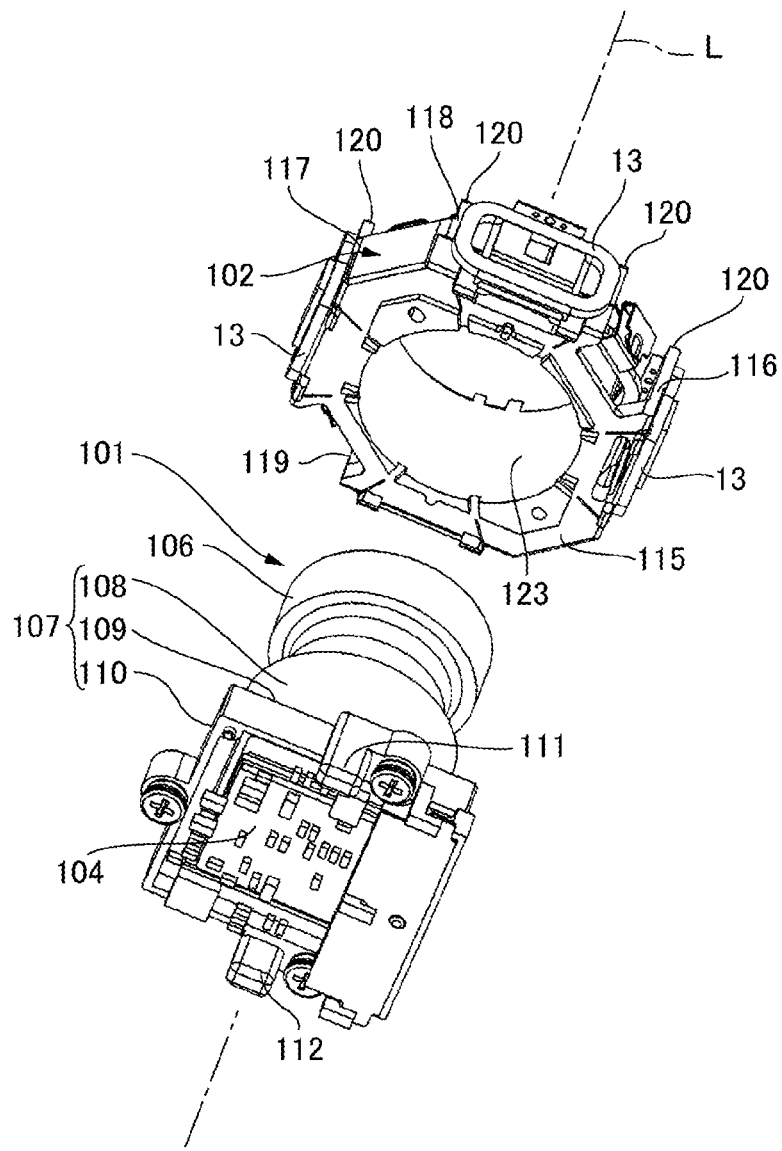
FIG. 9 is an exploded perspective view of the movable member when seen from the counter-object side.
Figure 9:
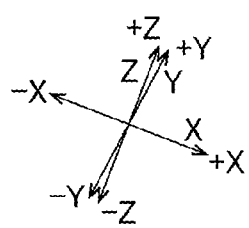

FIG. 8 is an exploded perspective view of the movable member 3, the swingable supporting mechanism 4, and the plate spring 9 when seen from the side in the +Z direction (object side). FIG. 9 is an exploded perspective view of the movable member 3, the swingable supporting mechanism 4, and the plate spring 9 when seen from the side in the −Z direction (counter-object side). As shown in FIG. 8 and FIG. 9, the movable member 3 is provided with: a camera module 101; and a camera module holder 102 configured to hold the camera module 101 from the outer circumferential side. The camera module 101, as shown in FIG. 2, has: an optical element 2; and an image pickup element 103 that is positioned on the optical axis of the optical element 2. The image pickup element 103 is implemented on a board 104 on which an electronic device such as a gyroscope or a signal processing circuit has been mounted. In addition, the camera module 101 has: a mirror cylinder member 106 configured to hold the optical element 2; and a frame 107 configured to hold the mirror cylinder member 106 and the board 104. As shown in FIG. 8, the frame 107 is provided with: a cylinder part 108 configured to hold, on the inner circumferential side, an end portion in the −Z direction of the mirror cylinder member 106; a rectangular plate part 109 spreading to the outer circumferential side from an end edge in the −Z direction of the cylinder part 108; and a rectangular tube part 110 extending in the −Z direction from an outer circumferential edge of the plate part 109. As shown in FIG. 9, the board 104 is held on the inner circumferential side of the rectangular tube part 110.

In the rectangular tube part 110, in the Y axis direction, an optical axis (axis L), an image pickup element 103, and a first projection part 111 for stopper and a second projection part 112 for stopper that project in the −Z direction on both side on which the board 104 is sandwiched therebetween are provided.

As shown in FIG. 9, the camera module holder 102 is provided with: a bottom plate part 115 formed in a substantially octagonal shape when seen from the side in the Z axis direction; a pair of wall parts 116, 117 rising in the +Z direction and extending in the Y axis direction on both ends in the X axis direction of the bottom plate part 115; and a pair of wall parts 118, 119 rising in the +Z direction and extending in the X axis direction on both sides in the Y axis direction of the bottom plate part 115. On end faces in the +Z direction in the respective wall parts 116, 117, 118, 119, two second projection parts 120 for stopper that project in the +Z direction are provided. The two second projection parts 120 for stopper respectively project from both end portions in the circumferential directions in each of the wall parts 116, 117, 118, 119. To each of the wall parts 116, 117, 118, 119, the swing driving coil 13 is fixed.

In addition, the camera module holder 102 is provided with a cylindrical holding part 123 rising in the +Z direction from an edge of a circular through hole that is formed at a center of the bottom plate part 115. In an annular end face 123a in the +Z direction of the holding part 123, plate spring bonding projection parts 124 for fixing the plate spring 9 are provided in four locations at equal angular intervals. As shown in FIG. 6, in the annular end face 123a, the outer circumferential side of the plate spring bonding projection part 124 is a movable member side plate spring fixing part 123b configured to fix the plate spring 9 thereto. The plate spring 9 is fixed via an adhesive layer to the movable member side plate spring fixing part 123b.

Here, the flexible printed circuit board 20b is fixed to the camera module 101, and is electrically connected to the swing driving coil 13 that is fixed to the respective wall parts 116, 117, 118, 119 of the camera module holder 102. The flexible printed circuit board 21 is fixed to the camera module 101, and is electrically connected to the board 104 that is held by the rectangular tube part 110 of the camera module 101. The flexible printed circuit boards 20b, 21 are drawn between the first projection part 111 for stopper and the second projection part 112 for stopper.

(Swingable Supporting Mechanism)

Figure 10:
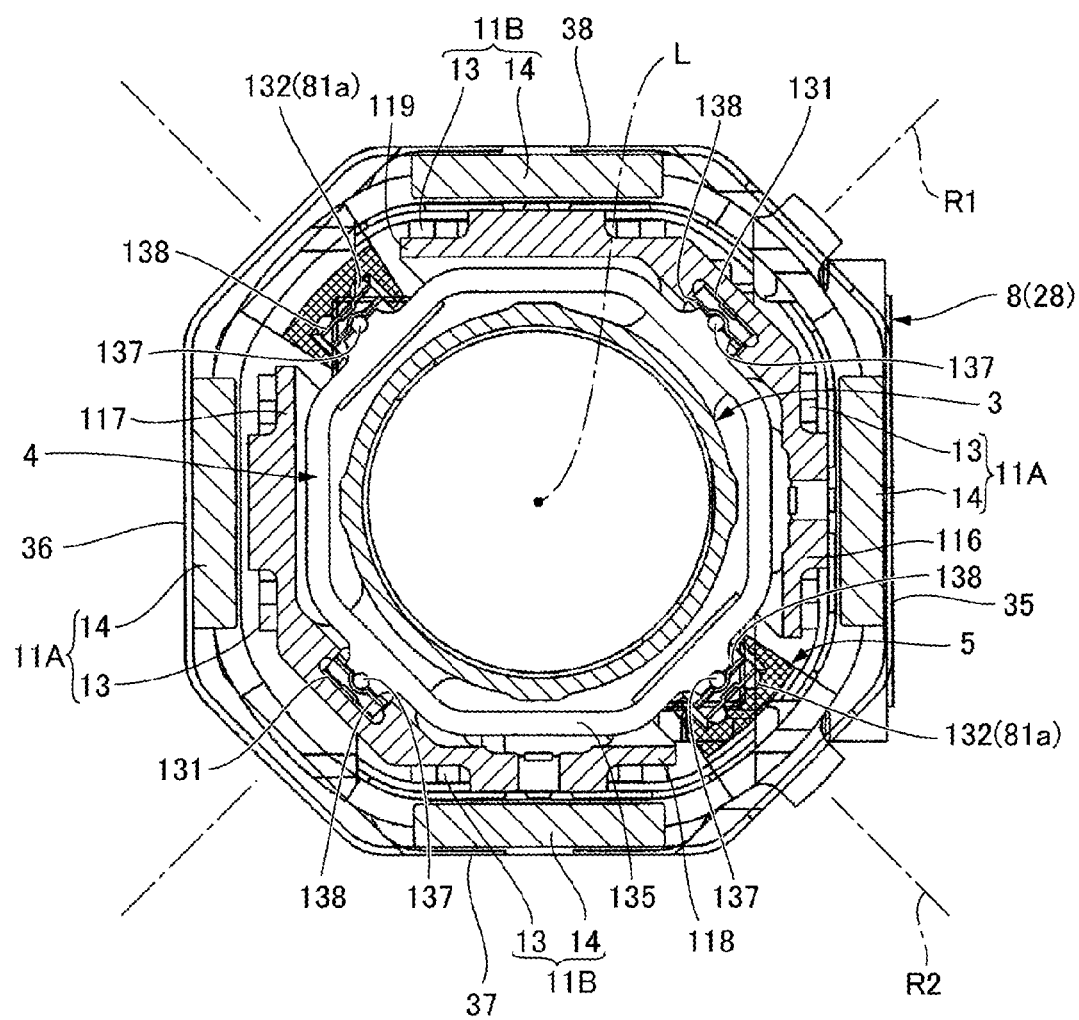
FIG. 10 is a sectional view of the optical unit when taken along a plane orthogonal to an axis.
Figure 10:
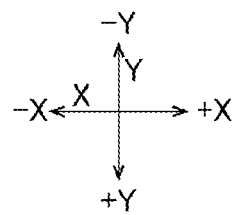

FIG. 10 is a sectional view of the optical unit 1 when taken along a plane that is orthogonal to the axis L, the plane passing through the swingable supporting mechanism 4. The swingable supporting mechanism 4 is arranged between the camera module holder 102 and the holder main body member 81. As shown in FIG. 6 and FIG. 7, the swingable supporting mechanism 4 is provided with: two first swingable supporting parts 131 that are provided in diagonal locations on a first axis R1 of the camera module holder 102; two second swingable supporting parts 132 that are provided in diagonal locations on a second axis R2 of the holder main body member 81; and a movable frame 135 that is supported by the first swingable supporting part 131 and the second swingable supporting part 132. Here, the first axis R1 and the second axis R2 each correspond to a direction tilting at an angle of 45 degrees relative to the X axis direction and the Y axis direction. Therefore, the first swingable supporting part 131 and the second swingable supporting part 132 each are disposed in an angular location between the X axis direction and the Y axis direction. As shown in FIG. 6 and FIG. 7, the second swingable supporting part 132 corresponds to a depression part 81a that is formed in an inside face of the holder main body member 81.

As shown in FIG. 10, the movable frame 135 corresponds to a plate-shaped spring formed in a substantially octagonal shape in planar view as seen from the side in the Z axis direction. On an outside face of the movable frame 135, metallic balls 137 are fixed by way of any means such as welding in four locations at the periphery of the axis L. These balls 137 respectively come into point contact with contact springs 138 held by the first swingable supporting part 131 that is provided in the camera module holder 102 and the second swingable supporting part 132 that is provided in the holder main body part 81. The contact spring 138 is a plate-shaped spring, the contact spring 138 held by the first swingable supporting part 131 is elastically deformable in the direction of the first axis R1, and the contact spring 138 held by the second swingable supporting part 132 is elastically deformable in the direction of the second axis R2. Therefore, the movable frame 135 is supported in a rotatable manner at the periphery of each of the two directions (the direction of the first axis R1 and the direction of the second axis R2) that are orthogonal to the Z axis direction.

(Plate Spring)

Figure 11A:
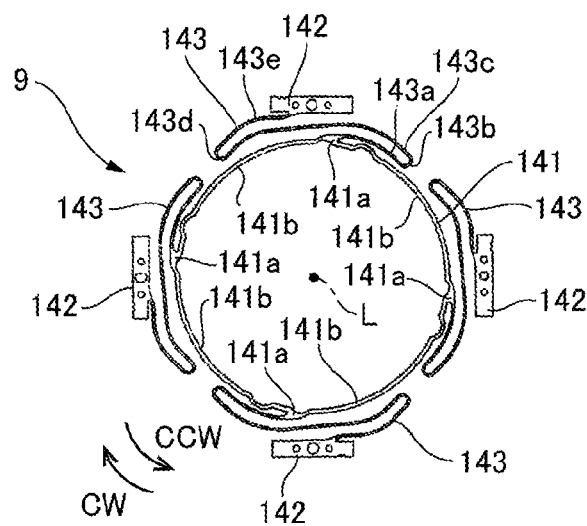
FIGS. 11A and 11B are illustrative views of a plate spring.
Figure 11B:
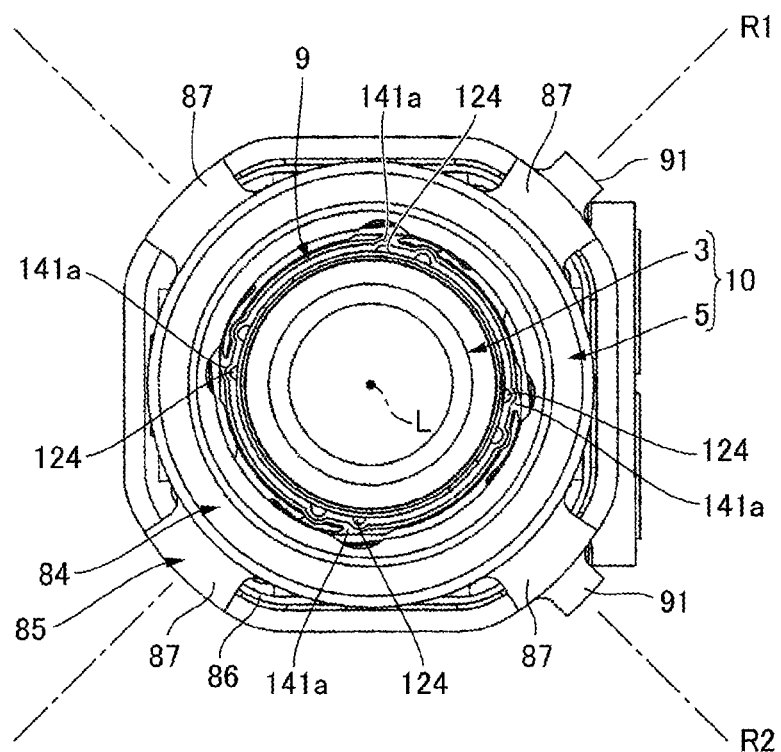
Figure 11B:
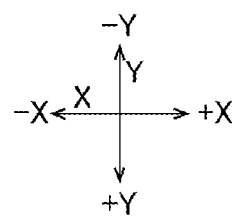

FIG. 11A is a plan view of the plate spring 9 when seen from the side in the Z axis direction, and FIG. 11B is a plan view of the movable member 3 and the holder 5 in a state in which the plate spring 9 is overhung when seen from the side in the +Z direction. As shown in FIG. 2, the plate spring 9 is overhung between the annular end face 123a of the holding part 123 of the camera module holder 102 (end face in the +Z direction) and the annular end face 84a oriented in the −Z direction in the holder side opposing part 84 of the holder main body member 81. The plate spring 9 defined a reference position of the movable member 3. That is, the position (reference position) of the movable member 3 (camera module 101) in a still state in which the magnetic driving mechanism 11 for swing is not driven is determined by the plate spring 9. As shown in FIG. 6, FIG. 7, and FIG. 11A, the plate spring 9 is a plate spring formed in the shape of a rectangular frame in which a metal plate has been machined.

As shown in FIG. 11A, the plate spring 9 is provided with: an annular movable side linking part 141 that is fixed to the movable body side plate spring fixing part 123b of the holding part 123; four holder side linking part 142 (supporting body side linking part) that are fixed to an end face of the holder main body member 81; and a meandering part 143 that is positioned between the movable side linking part 141 and each of the holder side linking parts 142 in a radial direction. The holder side linking parts 142 are disposed in two locations in which the optical axis L is sandwiched therebetween on both sides in the X axis direction and in two locations in which the optical axis L is sandwiched on both sides in the Y axis direction.

The movable member side linking part 141 is provided with: four linking portions 141a having cutouts engaging from the outer circumferential side with the four plate spring bonding projection parts 124 that are provided on the annular end face 123a of the holding part 123; and an arc-shaped connection portion 141b configured to connect the linking portions 141a that are respectively adjacent to each other in the circumferential direction. Here, the movable member side linking part 141 is fixed to the annular end face 123a via an adhesive layer. Therefore, in a state in which the movable member side linking part 141 has been fixed to the annular end face 123a, the plate spring 9 is unstable in the +Z direction from the annular end face 123a.

The meandering part 143, as shown in FIG. 11B, is provided with: a first extension portion 143a extending to one side (clockwise direction) in the circumferential direction on the outer circumferential side of the holding part 123 from the link portion 143a that is positioned on the outer circumferential side of the spring bonding projection part 124 in the state in which the movable side linking part 141 has been fixed to the holding part 123; a first return portion 143b curving to the other side in the circumferential direction from a tip end of the first extension portion 143a to the outer circumferential side; a second extension portion 143c extending from a tip end of the first return portion 143b to the other side (counterclockwise direction) in the circumferential direction on the outer circumferential side of the first extension portion 143a from a tip end of the first return portion 143b; a second return portion 143d curving to one side in the circumferential direction from a tip end of the second extension portion 143c to the outer circumferential side; and a third extension portion 143e extending to one side (clockwise direction) on the outer circumferential side of the second extension portion 143c from a tip end of the second return portion 143d. The tip end of the third extension portion 143e is positioned at the other side more significantly than the plate spring bonding projection part 124, and is connected to the holder side linking part 142.

(First Stopper Mechanism and Second Stopper Mechanism)

As shown in FIG. 2, when the movable member 3 has been swingably held by the holder 5, the first projection part 111 for stopper and the second projection part 112 for stopper, both of which project in the −Z direction from the movable member 3 (camera module 101), and the rectangular projection portion 82b that is provided in the opposing face 82a of the holder bottom plate member 82 respectively oppose to each other in the Z axis direction and configure the first stopper mechanism 17 configured to define a swinging range of the movable member 3. That is, if the movable member 3 is set in a tilt posture exceeding the swinging range, the first projection part 111 for stopper or the second projection part 112 for stopper abuts against the projection portion 82b, and restricts any more tilting of the movable member 3. Further, in the first stopper mechanism 17, in a case where the movable member 3 has been moved in the −Z direction by way of an external force, the first projection part 111 for stopper and the second projection part 112 for stopper abut against the projection portion 82b, and restricts any more movement of the movable member 3 in the −Z direction.

In addition, when the movable member 3 has been swingably held by the holder 5, a second projection part 120 for stopper, that is provided in the movable member 3 (camera module holder 102), and the annular end face 84a in the −Z direction of the holder side opposing part 84 respectively oppose to each other in the Z axis direction and configure the second stopper mechanism 18 configured to define a second swinging range of the movable member 3. That is, if the movable member 3 is set in a tilt posture exceeding the second swinging range, the second projection part 120 for stopper abuts against the annular end face 84a, and restricts any more tilting of the mobile member 3. Further, in the second stopper mechanism 18, in a case where the movable member 3 has been moved in the +Z direction by way of an external force, the second projection part 120 for stopper abuts against the annular end face 84a, and restricts any more movement of the movable member 3 in the +Z direction. The second swinging range that the second stopper mechanism 18 defines is the same as the swinging range that the first stopper mechanism 17 defines.

Here, the end face 65a of the plate spring fixing part 65 serves as a deformation range defining part configured to restrict the deformation range in which the plate spring 25 deforms. That is, in a case where an external force is applied in the −Z direction by impact or the like, the second movable member 10 (movable member 3 and holder 5) moves in the −Z direction and thus the plate spring 25 slackens in the −Z direction on the inner circumferential side (center portion in the Y axis direction). Here, if the plate spring 25 deforms in excess of an elastic deformation range, damage such as plastic deformation occurs to the plate spring. On the other hand, the plate spring 25, in a pair of plate spring fixing parts 65 that are provided on both sides on which the axis L is sandwiched therebetween, is fixed to the projection part 65b that projects in the +Z direction from the end face 65a oriented in the +X direction and thus if the plate spring 25 slackens in the −Z direction, the end face 65a of the plate spring fixing part 65 abuts against the plate spring 25 from the side in the −Z direction, and restricts any more deformation of the plate spring 25 in the −Z direction. In this manner, damage to the plate spring 25 can be prevented. In addition, excessive slackening of the plate spring 25 in the −Z direction is restricted by the end face 65a of the plate spring fixing part 65 and thus in a case where an external force is applied in the −Z direction by impact or the like, it may be possible to prevent excessive movement of the second movable member 10 (movable member 3 and holder 5) in the −Z direction. In this manner, it may be possible to prevent the fixing member side opposing part 55 and the holder side opposing part 84 from being excessively spaced from each other and thus balls 151 positioned therebetween do not slip off.

(Object Side Rotation Supporting Mechanism and Counter-Object Side Rotation Supporting Mechanism)

Next, a description will be given with respect the object side rotation supporting mechanism 6 and the counter-object side rotation supporting mechanism 7 configured to rotatably support the holder 5 at the periphery of the axis L. As shown in FIG. 2, FIG. 3, and FIG. 4, the object side rotation supporting mechanism 6 is provided with: a plurality of balls 151 (rolling members); and a retainer 152 configured to hold the balls 151 between the fixing member side opposing part 55 and the holder side opposing part 84. As shown in FIG. 3 and FIG. 4, the retainer 152 has a plurality of through holes 153 that are arranged at equal intervals in the circumferential direction. A respective one of the plurality of balls 151 is inserted into the fixing member side annular groove 56 and the holder side annular groove 90 while being disposed inside of a respective one of a plurality of through holes 153. Lubricating oil is applied to the inner circumferential faces of the fixing member side annular groove 56 and the holder side annular groove 90. In the present embodiment, the number of balls 151 and the number of through holes 153 are respectively six. The balls 151 roll in the fixing member side annular groove 56 and the holder side annular groove 90 while being positioned inside of the through holes 153.

In addition, the retainer 152 is provided with: a first projection part 154 that projects toward the fixing member side opposing part 55; and a second projection part 155 that projects toward the holder side opposing part 84 between the two through holes 153 that are adjacent to each other in the circumferential direction. As shown in FIG. 3, the first projection part 154 extends in the radial direction, and is provided with an arc face that projects in the +Z direction from each end in the circumferential direction to a center. As shown in FIG. 4, the second projection part 155 extends in the radial direction, and is provided with an arc face that projects in the −Z direction from each end in the circumferential direction to the center. A center portion in the circumferential direction of the first projection part 154 is capable of coming into slide contact with an edge portion on the inner circumferential side and an edge portion on the outer circumferential side of the fixing member side annular groove 56 in the fixing member side opposing part 55. A center portion in the circumferential direction of the second projection part 155 is capable of coming into slide contact with an edge portion on the inner circumferential side and an edge portion on the outer circumferential side of the holder side annular groove 90 in the holder side opposing part 84. Further, the retainer 152 has cutout parts 152a in two spaced locations of an outer circumferential edge. In the present embodiment, the cutout parts 152a are provided at angular intervals of 180 degrees.

Here, as shown in FIG. 2, at an end portion of the inner circumferential side more significantly than the fixing member side annular groove 56 in the fixing member side opposing part 55, an annular projection part 157 that projects in the −Z direction is provided. On the other hand, at an end portion of the inner circumferential side more significantly than the holder side annular groove 90 in the holder side opposing part 84, an annular stepped part 158 depressed in the −Z direction and configured to receive a tip end portion of the annular projection part 157 is provided. The annular stepped part 158 is provided with: an annular radial opposing face 158a that opposes at small intervals from the outer circumferential side at the tip end portion of the annular projection part 157; and an annular axial opposing face 158b that opposes at small intervals from the side in the Z axis direction at the tip end portion of the annular projection part 157. A space between the annular projection part 157 and the radial opposing face 158a and a space between the annular projection part 157 and the axial opposing face 158b communicate with each other, and these spaces configure a rabbi squirrel seal. This rabbi squirrel seal prevents or restricts entry of dust between the fixing member side opposing part 55 on which the ball 151 rolls and the holder side opposing part 84.

Next, the ball bearing 68 of the counter-object side rotation supporting mechanism 7, as shown in FIG. 2, is provided with: the inner ring 68b that is held on the outer circumferential side of the shaft part 96 of the holder 5 (holder bottom plate member 82); the outer ring 68a that is positioned on the outer circumferential side of the inner ring 68b; and a plurality of balls 68c that roll between the inner ring 68b and the outer ring 68a in the radial direction. The outer ring 68a is held by the movable holder 26.

Here, the plate spring 25 is configured to impart, to the ball bearing 68, a given pressure (biasing force F) that is applied in the +Z direction. That is, the plate spring 25 is configured to bias the movable holder 26 toward the holder bottom plate member 82 to thereby bias the outer ring 68a that is held by the holder 5 to the holder bottom plate member 82. In this manner, the inner ring 68b and the outer ring 68a are positioned with respect to a relative location in the Z axis direction with reference to the holder bottom plate member 82. In addition, by the given pressure (biasing force F of the plate spring 25), a state in which the outer ring 68a has abutted against the holder bottom plate member 82 is maintained. In this manner, rotation of the holder 5 that is supported by the second rotation supporting mechanism 7 is stabilized.

Further, the plate spring 25 is configured to bias the holder 5 toward the fixing member side opposing part 55 of the fixing member 8 (counter-object side casing 29) via the movable holder 26 and the outer ring 68a. In this manner, the plate spring 25 applies a given pressure (biasing force F of FIG. 2) that is oriented in the +Z direction to the object side rotation supporting mechanism 6. That is, the plate spring 25 is configured to bias the holder side opposing part 84 toward the fixing member side opposing part 55 in the Z axis direction. In this manner, the holder side opposing part 84 and the fixing member side opposing part 55 are not spaced from each other in the Z axis direction and thus the balls 151 that are held by the retainer 152 do not slip off from a gap between the holder side annular groove 90 of the holder side opposing part 84 and the fixing member side annular groove 56 of the fixing member side opposing part 55, and the holder 5 rotates smoothly relative to the fixing member 8.

(Third Stopper Mechanism)

Here, as shown in FIG. 1, when the holder 5 has been rotatably supported by the fixing member 8, the projection 91 that is provided in the holder 5 (holder body part) is inserted from the inner circumferential side into the cutout part 40 of the fixing member 8 (cylindrical casing 28). In this manner, the cutout part 40 of the fixing member 8 and the projection 91 of the holder 5 configure the third stopper mechanism 19 configured to define a rotation range at the periphery of the axis L of the holder 5 (second movable member 10). That is, the holder rotates at the periphery of the axis L in a range in which the projection 91 is movable in the cutout part 40 in the circumferential direction.

(Magnetic Driving Mechanism for Swing)

Next, the magnetic driving mechanism 11 for swing, as shown in FIG. 10, is provided with a first magnetic driving mechanism 11A for swing and a second magnetic driving mechanism 11B for swing, both of which are provided between the movable member 3 and the fixing member 8. The first magnetic driving mechanism 11A for drive is provided in two sets, each of which consists of a swing driving magnet 14 and a swing driving coil 13 respectively opposing to each other in the X axis direction. The second magnetic driving mechanism 11B for swing is provided in two sets, each of which consists of the swing driving magnet 14 and the swing driving coil 13 respectively opposing to each other in the Y axis direction. The swing driving coil 13 is held on the outside faces of the wall parts 116, 117 on both sides in the X axis direction and the wall parts 118, 119 on both sides in the Y axis direction of the camera module holder 102. The swing driving magnet 14 is held on the inside face of each of the side plates 35, 36, 37, 38 that are provided in the cylindrical casing 28 of the fixing member

8. Each swing driving magnet 14, as shown in FIG. 3 and FIG. 4, is divided into two sections in the X axis direction, and the magnetic poles on the interior face side are magnetized so as to be different from each other with reference to a divisional location (magnetized polarized line). The swing driving coil 13 is a coreless coil, and the long edge portions in the +Z direction and −Z direction each are utilized as an effective edge. Here, the cylindrical casing 28 is made of a magnetic material and thus function as a yoke relative to the swing driving magnet 14.

Two sets of the second magnetic driving mechanism 11B for swing, both of which are positioned in the +Y direction and the −Y direction of the movable member 3, are connected by way of wiring so that a magnetic driving force in the same direction at the periphery of the X axis is generated when power is supplied to the swing driving coil 13. In addition, two sets of the first magnetic driving mechanism 11A for swing, both of which are positioned in the +X direction and the −X direction of the movable member 3 are connected by way of wiring so that a magnetic driving force in the same direction at the periphery of the Y axis is generated when power is supplied to the swing driving coil 13. The magnetic driving mechanisms 11 for swing is configured to combine rotation at the periphery of the X axis by the second magnetic driving mechanism 11B for swing and rotation of the Y axis by the first magnetic driving mechanism 11A for swing with each other to thereby rotate the movable member 3 at the periphery of the first axis R1 and the second axis R2. In a case where shake correction at the periphery of the X axis and shake correction at the periphery of the Y axis are carried out, this driving mechanism is configured to combine the rotation at the periphery of the first axis R1 and the rotation at the periphery of the second axis R2 with each other.

(Magnetic Driving Mechanism for Rolling)

The magnetic driving mechanism 12 for rolling, as shown in FIG. 2 and FIG. 4, in the holder bottom plate member 82, is provided with: two rolling driving coils 15 that is held by the rolling driving coil holding parts 97 that are provided on both sides on which the shaft part 96 is sandwiched therebetween in the Y axis direction; and two rolling driving magnets 16 that are held by the movable holder of the fixing member 8, the rolling driving magnets respectively opposing to the rolling driving coils 15 in the Z axis direction. Each rolling driving magnet 16 is divided into two sections in the circumferential direction as shown in FIG. 3 and FIG. 5, and the magnetic poles on faces opposing to the rolling driving coils 15 is magnetized so as to be respectively different from each other with reference to a divisional location (magnetized polarized line). Each rolling driving coil 15 is a coreless coil, and a long edge portion extending in the radial direction is utilized as an effective edge.

(Shake Correction of Optical Unit)

The optical unit 1, as described above, is provided with the magnetic driving mechanism 11 for rolling, configured to carry out shake correction at the periphery of the X axis and shake correction at the periphery of the Y axis. Therefore, this optical unit is capable of carrying out shake correction in the pitching (vertical swing) direction and the yawing (transverse swing) direction. In addition, the optical unit 1 is provided with the magnetic driving mechanism 12 for rolling and thus this optical unit is capable of carrying out shake correction in the rolling direction. Here, in the optical unit 1, the movable member 3 is provided with a gyroscope, and by way of the gyroscope, the vibration at the periphery of the three axes orthogonal to each other is detected and the magnetic driving mechanism 11 for swing and the magnetic driving mechanism 12 for rolling are driven so as to eliminate the detected vibration.

(Functions and Advantageous Effects)

In the present embodiment, the inner ring 68b of the ball bearing 68 is held by the second movable member 10 (holder bottom plate member 82 of holder 5), and the outer ring 68a is held by the movable holder 26 of the fixing member 8. The movable holder 26 is also biased in the +Z direction by the plate spring 25, whereby the given pressure (biasing force F) is applied to the outer ring 68a and then the outer ring 68a abuts against the holder bottom plate member 82. In this manner, the inner ring 68b and the outer ring 68a are positioned in the Z axis direction with reference to the holder 5. In addition, the outer ring 68a is maintained in a state in which the outer ring has been abutted against the holder bottom plate member 82 by way of the given pressure (biasing force F) of the plate spring 25. Accordingly, rotation of the holder 5 can be stabilized.

In addition, if the inner ring 68b of the ball bearing 68 that is held by the movable holder 26 abuts against the holder bottom plate member 82, a relative position between the movable holder 26 and the holder bottom plate member 82 in the Z axis direction is determined. In this manner, a gap between the rolling driving magnet 16 that is held by the movable holder 26 and the rolling driving coil 15 that is held by the holder bottom plate member 82 is precisely defined. Therefore, the holder 5 can be stably rotated by the magnetic driving mechanism 12 for rolling.

Further, the movable holder 26 is provided with the yoke 72 that abuts against the rolling driving magnet 16 from the side in the −Z direction. Therefore, the magnetic driving mechanism 12 for rolling is capable of improving a driving torque of rotating the holder 5 in comparison with a case in which the yoke 72 is not provided. Furthermore, the magnetic driving mechanism 12 for rolling is capable of restricting power consumption in a case of generating a same torque, in comparison with the case in which the yoke 72 is not provided.

Still furthermore, in the present embodiment, the second movable member 10 (holder bottom plate member 82 of holder 5) is provided with the shaft part 96 configured to hold the inner ring 68b on the outer circumferential side while projecting toward the movable holder 26 in the Z axis direction. Therefore, the inner ring 68b of the ball bearing 68 can be easily held by the second movable member 10.

Further, in the present embodiment, the object side rotation supporting mechanism 6 configured to rotatably support the holder 5 at the periphery of the axis L in a location that is spaced from the counter-object side rotation supporting mechanism 7 in the Z axis direction is provided. Therefore, the rotary shaft of the holder 5 does not vibrate. In addition, the plate spring 25 of the fixing member 8 applies a given pressure that is oriented in the +Z direction to the object side rotation supporting mechanism 7 (outer ring 68a of ball bearing 68) via the movable holder 26 and thus rotation of the holder 5 that is supported by the counter-object side rotation supporting mechanism 7 can be stabilized. Further, the plate spring 25 of the fixing member 8 is configured to bias the holder 5 toward the fixing member side opposing part 55 of the fixing member 8 (object side casing 29) via the movable holder 26 and the outer ring 68a. That is, the plate spring 25 applies the given pressure (biasing force F) that is oriented in the +Z direction to the object side rotation supporting mechanism 6. In this manner, the holder side opposing part 84 and the fixing member side opposing part 55 are not spaced from each other in the Z axis direction and thus the balls 151 that are held by the retainer 152 do not slip off from a gal between the holder side annular groove 90 of the holder side opposing part 84 and the fixing member side annular groove 56 of the fixing member side opposing part 55, and the holder 5 rotates smoothly relative to the fixing member 8.

Modification Example

Incidentally, the swing driving coil 13 and the swing driving magnet 14 can be exchanged in layout. That is, the swing driving coil 13 may be held by the fixing member 8, and the swing driving magnet 14 may be held by the holder 5. In addition, the rolling driving coil 15 and the rolling driving magnet 16 can be exchanged in layout. That is, the rolling driving coil 15 may be held by the fixing member 8 (movable holder 26), and the rolling driving magnet 16 may be held by the holder 5 (holder bottom plate member 82). In this case, the holder bottom plate member 82 can be formed of a magnetic material to thereby obtain a yoke, and the members configuring the yoke 72 in the movable holder 26 can be formed of a resin material.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correction function, the optical unit comprising:
    an optical module configured to hold an optical element;
    a supporting member configured to support the optical module;
    a rotation supporting mechanism configured to rotatably support the supporting member around a predetermined axis;
    a fixing member configured to support the supporting member via the rotation supporting mechanism; and
    a rolling magnetic driving mechanism configured to rotate the supporting member,
    wherein the rotation supporting mechanism comprises a rolling bearing,
    the rolling magnetic driving mechanism comprises a magnet and a coil that respectively oppose to each other in a direction of the predetermined axis,
    the fixing member comprises:
        a fixing member main body;
        a spring member that is fixed to the fixing member main body; and
        a movable holder that is supported by the fixing member main body via the spring member, the movable holder being movable in the direction of the predetermined axis,
    the movable holder opposes to the supporting member in the direction of the predetermined axis,
    the supporting member comprises a supporting member side opposing part that opposes to the movable holder,
    the rolling bearing comprises:
        an inner ring that is coaxial to the predetermined axis, the inner ring being held by the supporting member;
        an outer ring that is disposed on an outer circumferential side of the inner ring, the outer ring being held by the movable holder; and
        a ball that rolls between the inner ring and the outer ring,
    the movable holder is configured to hold either one of the magnet and the coil,
    the supporting member side opposing part is configured to hold another one of the magnet and the coil, and
    the spring member is configured to bias the movable holder toward the supporting member side opposing part to thereby cause the outer ring to abut against the supporting member side opposing part.

2. The optical unit with shake correction function according to claim 1, wherein
    the coil is held by the supporting member side opposing part,
    the magnet is held by the movable holder,
    the movable holder comprises a yoke that abuts against the magnet from an opposite side to the supporting member side opposing part, and
    the spring member is configured to abut against the yoke from an opposite side to the magnet to thereby bias the movable holder.

3. The optical unit with shake correction function according to claim 1, wherein the supporting member side opposing part comprises a shaft part configured to hold the inner ring on an outer circumferential side while projecting toward the movable holder in the direction of the predetermined axis.

4. The optical unit with shake correction function according to claim 1, wherein
    the fixing member main body comprises:
        a pair of spring member fixing parts configured to fix the spring member on both sides on which the predetermined axis is sandwiched therebetween; and
        a deformation range defining part configured to define a deformation range in which the spring member deforms,
    the spring member fixing part comprises:
        an end face that is oriented in a direction oriented toward the supporting member from the movable holder in the direction of the predetermined axis; and
        a projection that projects from the end face,
    the spring member is a plate spring that is overhung on the projection of the pair of spring member fixing parts, and is configured to hold the movable holder between the pair of spring member fixing parts, and
    the end face of the spring member fixing part is the deformation range defining part, and configured to abut against the plate spring when the plate spring deforms in a direction that is spaced from the supporting member.

5. The optical unit with shake correction function according to claim 1, further comprising a second rotation supporting mechanism configured to rotatably support the supporting member around the predetermined axis in a location that is spaced from the rotation supporting mechanism in the direction of the predetermined axis, wherein
    the fixing member main body comprises a fixing member side opposing part that opposes to the supporting member from an opposite side to the movable holder in the direction of the predetermined axis,
    the supporting member comprises a second supporting member side opposing part that opposes to a fixing member side opposing part in the direction of the predetermined axis, the second rotation supporting mechanism comprises:
a fixing member side annular groove that is provided in the fixing member side opposing part, the fixing member side annular groove surrounding the predetermined axis;
a supporting member side annular groove that is provided in the second supporting member side opposing part, the supporting member side annular groove opposing to the fixing member side annular groove; and
a rolling member that is inserted into the fixing member side annular groove and the supporting member side annular groove, the rolling member being configured to roll between the fixing member side opposing part and the second supporting member side opposing part, and
the spring member is configured to bias the supporting member toward the fixing member side opposing part via the movable holder and the outer ring.

6. The optical unit with shake correction function according to claim 1, including a swing magnetic driving mechanism, wherein
the supporting member is configured to support the swingable supporting mechanism configured to swingably support the optical module between a reference posture in which the predetermined axis and an optical axis are coincident with each other and a tilt posture in which the optical axis tilts relative to the predetermined axis, and
the swing magnetic driving mechanism is configured to swing the optical module relative to the supporting member.

* * * * *